United States Patent [19]

Ducanis

[11] Patent Number: 5,113,730
[45] Date of Patent: May 19, 1992

[54] BAR STOCK GUIDE ARRANGEMENT FOR SCREW MACHINES

[76] Inventor: Paul Ducanis, 17401 NW. 2nd Ave., Miami, Fla. 33169

[21] Appl. No.: 205,954

[22] Filed: Jun. 13, 1988

[51] Int. Cl.⁵ ............................................. B23B 25/00
[52] U.S. Cl. ........................................ 82/162; 82/152
[58] Field of Search ............... 82/38 R, 38 A, 2.7, 82/2 A, 162, 152

[56] References Cited

U.S. PATENT DOCUMENTS

| | | | |
|---|---|---|---|
| 3,600,990 | 8/1971 | Renoux | 82/38 R |
| 4,000,797 | 1/1977 | Ducanis | 193/38 |
| 4,030,585 | 6/1977 | Ducanis | 193/38 |
| 4,130,035 | 12/1978 | Langley | 82/38 A |
| 4,566,358 | 1/1986 | Ducanis | 82/38 R |

Primary Examiner—Frederick R. Schmidt
Assistant Examiner—Lawrence Cruz
Attorney, Agent, or Firm—Oltman and Flynn

[57] ABSTRACT

A bar stock guide arrangement for screw machines having a rotatably mounted fitting which has a horizontal opening for loosely passing the bar stock and guide rollers in the fitting at circumferentially spaced locations around the bar stock. The guide rollers are on roller supports which are selectively adjustable radially of the fitting to accommodate different bar stock diameters. Weights are slidably received in the fitting between the roller holders, and centrifugal force on the weights produces inward force on the roller holders to hold the guide rollers against the bar stock. Each fitting has a central hub slidably received, on and detachable from, a corresponding tube on a rigid cross plate which supports the fitting.

20 Claims, 3 Drawing Sheets

BAR STOCK GUIDE ARRANGEMENT FOR SCREW MACHINES

BACKGROUND OF THE INVENTION

In the operation of screw machines of known design, the bar stock is fed into the machine in long lengths and has had a very considerable tendency to vibrate transverse to its length. Usually, the rotating bar stock is passed through an elongated guide tube held stationary at the inlet side of the screw machine. The rotating bar stock has a loose fit inside the non-rotating guide tube and it is free to vibrate transversely, striking the tube and thereby causing appreciable noise and often damaging the bar stock itself, particularly if it is of hexagonal or other polygonal, sharp cornered cross-section. Excessive noise in a machine shop is an occupational harzard which can be damaging to the safety, health and well-being of workers there and is contrary to federal policy, as expressed in the Occupational Safety and Health Act.

My U.S. Pat. No. 4,566,358 discloses a bar stock guide which does away with the usual continuous guide tube and instead provides a rotatably mounted fitting which has a horizontal opening for loosely passing the bar stock and guide rollers in the fitting at circumferentially spaced locations around the bar stock. The guide rollers are on roller supports which are radially slidable in the fitting and have rack teeth on their opposite sides. Weights are slidable radially in the fitting between the successive roller supports, and these weights have rack teeth in their opposite sides. Pinion gears are mounted in the fitting to engage the rack teeth on the roller supports and the weights so that centrifugal force on each weight produces an inward force on the neighboring roller support. Springs bias the weights radially outward.

My U.S. Pat. Nos. 4,000,797 and 4,030,585 disclose bar stock guides generally similar to those disclosed in U.S. Pat. No. 4,566,358 but differing from it in that the guide rollers are resiliently mounted in various ways.

SUMMARY OF THE INVENTION

One aspect of the present invention relates to a modification of the bar stock guide arrangement of U.S. Pat. No. 4,566,358 to better accommodate different cross-sectional sizes of the bar stock.

In accordance with this aspect of the invention, the holders for the rollers or other guide elements are adjustable radially in or out to accommodate smaller or larger bar stock, but without affecting the coaction between those roller holders and the centrifugally slidable weights.

Another aspect of my invention is directed to a bar stock guide arrangement having a fixed standard rotatably supporting a fitting which passes the bar stock between guide rollers and having a novel readily detachable coupling between the fitting and the fixed standard.

Preferably, the present invention comprises a rotatably mounted fitting having guide rollers and centrifugal weights operating as disclosed in my U.S. Pat. No. 4,566,358 but with roller supports of novel design. Each roller support comprises an internally screw-threaded outer sleeve and an externally screw-threaded inner body which is screw-threadedly adjustable along the inside of the outer sleeve. The outer sleeve is radially slidable in the fitting and it has rack teeth on the outside, meshing with pinion gears which also mesh with rack teeth on the weights. The inner body carries the guide roller. The outer sleeve and the inner body have registering transverse slots which closely receive a retainer bolt threadedly mounted in the fitting. This bolt may be removed temporarily from the fitting to permit the inner body to be rotatively adjusted in or out along the outer sleeve, thereby adjusting the radial position of the guide roller, after which the retainer bolt is again mounted in the fitting, passing through the aligned slots in the outer sleeve and the inner body to hold the inner body in the position to which it has been adjusted along the outer sleeve. The fitting has an annular neck on one side which fits snugly around a sleeve attached to the fixed standard. Spring-pressed plungers on the neck of the fitting lock it to the sleeve and enable it to be detached readily from the sleeve by pulling these locking plungers out.

Further objects and advantages of this invention will be apparent from the following detailed description of a presently preferred embodiment which is illustrated schematially in the accompanying drawings.

DETAILED DESCRIPTION

Figures 1, 2, 3:
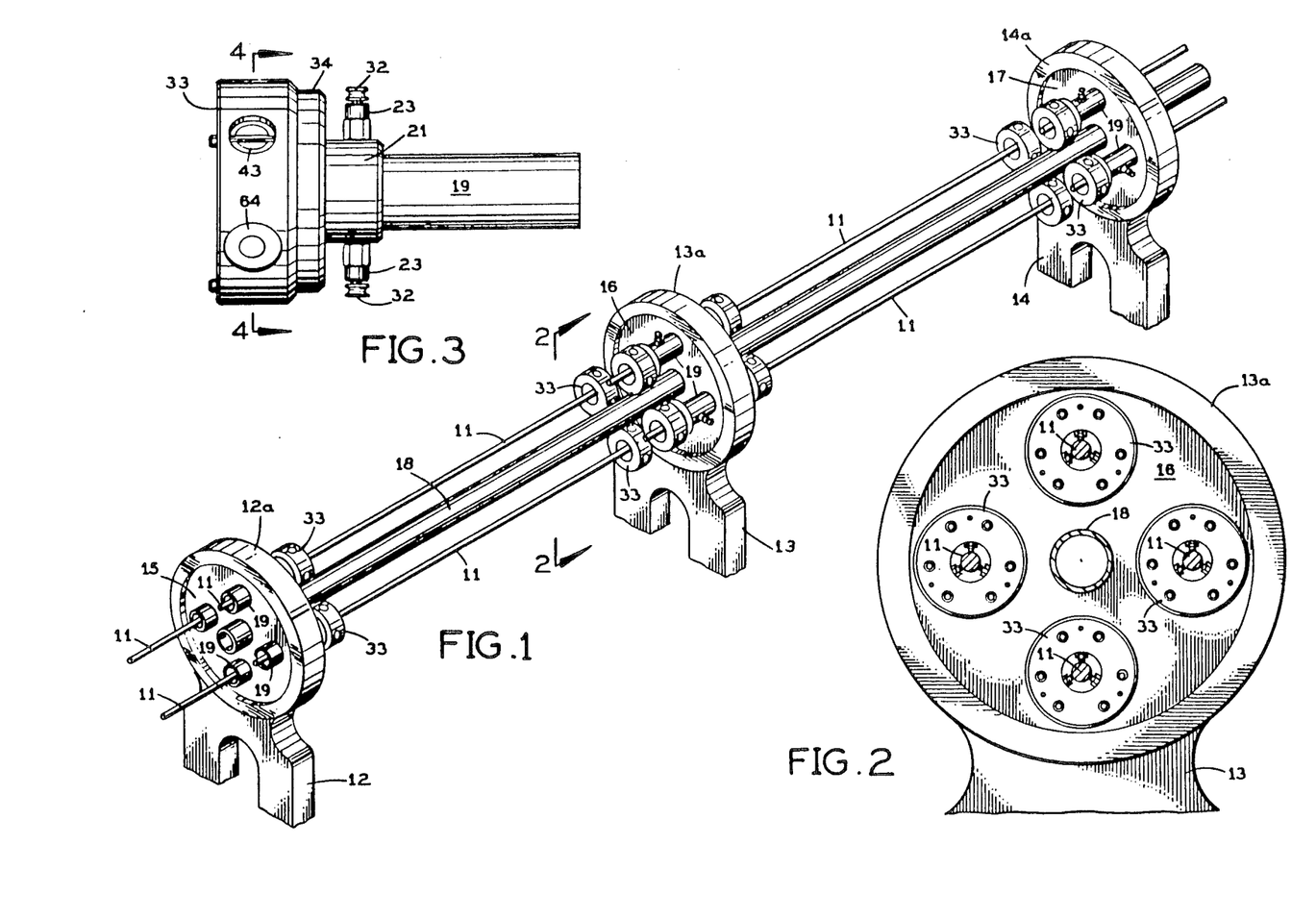
FIG. 1 is a perspective view showing a bar stock guide arrangement embodying several bar stock guide fittings in accordance with the present invention and located at the inlet side of a multiple screw machine.
FIG. 2 is a vertical cross-section taken along the line 2—2 in FIG. 1 near one cross plate in this bar stock guide arrangement.
FIG. 3 is a longitudinal elevational view of a bar stock guide fitting according to the present invention.

Referring first to FIG. 1, in a typical multiple screw machine (not shown), separate elongated bars of stock 11 extend parallel to each other at the inlet side of the screw machine. One bar 11 at a time is fed longitudinally into the screw machine and is rotated by the machine as it is screw-threaded in a known manner. Prior to the present invention, the common practice has been to provide a long non-rotational guide tube for each bar 11 at the inlet side of the screw machine. The rotating bar stock would tend to vibrate transversely inside the non-rotating guide tube, producing excessive noise, sometimes damaging the bar stock, tending to cause excessive wear on various parts of the screw machine, and reducing the dimensional precision of the screw-threading operation.

In an apparatus embodying the present invention, rotatable, annular guide fittings are provided at suitable intervals along the length of each bar's travel at the inlet side of the screw machine. These guide fittings support and guide the bar, minimizing its tendency to vibrate transversely. Between successive guide fittings the bar is unconfined, there being no need for the usual guide tube of the prior art. In accordance with the present invention, each guide fitting has a novel arrangement for adapting it to different bar stock diameters.

As shown in FIG. 1, three support standards 12, 13 and 14 are located in succession at suitable intervals along the path of the bar stock at the inlet side of the screw machine. It is to be understood that a greater or smaller number of such standards may be provided, as desired, extending up from the floor of the machine shop. The standards have respective rings 12a, 13a and 14a at their upper ends which rotatably receive and support corresponding rigid cross plates 15, 16 and 17 of circular out-line. The cross plates are attached to a central shaft 18 which extends coaxially through the rings 12a, 13a and 14a. This shaft is arranged to be turned through successive quarter-turns so as to rotatively index the cross plates 15, 16 and 17 simultaneously as one bar 11 is used up in the screw machine and the next one is to be used.

Figures 4, 5, 6, 7:
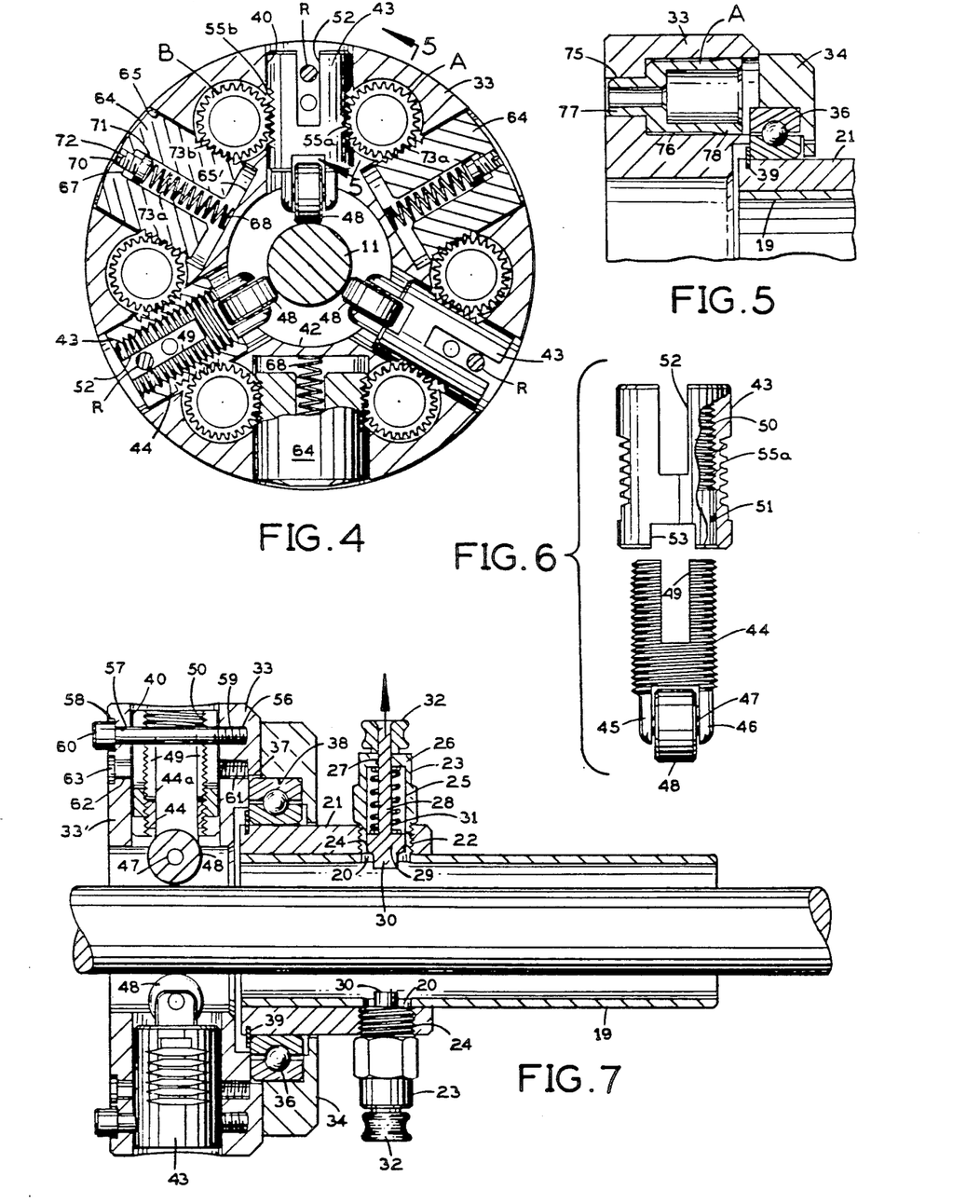
FIG. 4 is a cross-section taken along the line 4—4 in FIG. 3.
FIG. 5 is a fregmentary longitudinal section taken along the line 5—5 in FIG. 4.
FIG. 6 is an exploded view of one of the adjustable roller supports in the present bar stock guide fitting.
FIG. 7 is a longitudinal section of the present bar stock guide fitting mounted on a cross plate in the FIG. 1 apparatus.

Four identical bar stock guide fittings in accordance with the present invention are mounted on each of the first and last support plates 15 and 17 at the inlet side of each and at 90 degree intervals circumferentially, and four are mounted on the middle support plate 16 at its inlet side and another four at its outlet side, as shown in FIG. 1. Each fitting is removably mounted on a corresponding cylindrical tube 19 which is rigidly attached to the corresponding support plate 15, 16 or 17. As shown in FIG. 7, tube 19 has a pair of diametrically opposed openings 20.

Referring to FIG. 7, each fitting has a generally cylindrical hub 21 which snugly but slidably receives tube 19. Hub 21 has diametrically opposed screw-threaded openings 22 for registration with the openings 20 in the tube 19. A respective casing 23 with screw-threaded inner end segment 24 is screw-threadedly mounted in each opening 22 and extends radially outward from hub 21. Casing 23 has a cylindrical recess 25 along substantially its entire length. Casing 23 has a transverse outer end wall 26 with a central circular opening 27 leading into its recess 25 and slidably receiving the stem 28 of a locking plunger. This plunger has an enlarged head 29 on its inner end which is slidably received in recess 25 and a reduced diameter extension 30 which projects inward beyond the threaded inner end segment 24 of casing 23 and is received in the opening 20 in tube 19. A coil spring 31 is engaged under compression between head 28 and the outer end wall 26 of casing 23 to bias the plunger inwardly to the locking position shown in FIG. 7. A knob 32 is affixed to the plunger stem outside the outer end wall 26 to casing 23 to limit the inward movement of the plunger under the urging of spring 31. Knobs 32 may be grasped to retract the plunger 28–30.

Figures 8, 9, 10:
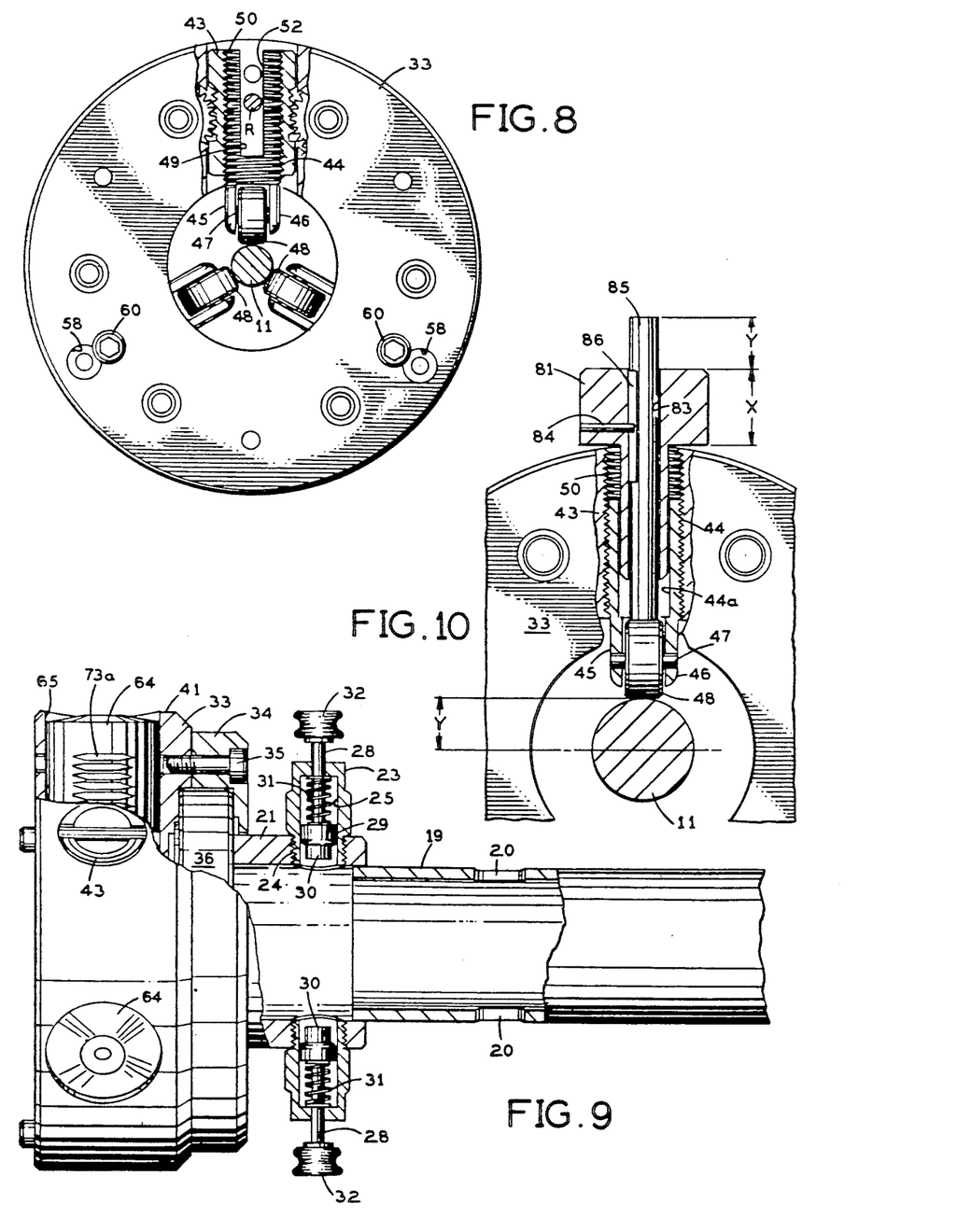
FIG. 8 is an end elevation taken from the left end in FIG. 7 and partly broken away to reveal working parts of the bar stock guide fitting.
FIG. 9 is a view, partly in longitudinal section and partly in elevation, showing the bar stock guide fitting removed from the guide tube which is attached to the corresponding cross plate in the FIG. 1 apparatus.
FIG. 10 is a fragmentary cross-section showing a roller-setting tool for use with the present bar stock guide fitting.

It will be apparent that, with both plungers 28–30 retracted, the hub 21 of the bar stock guide fitting can be slid onto tube 19 until its plungers snap into the opening 20 in the tube. This mounts the bar stock guide fitting on the tube. The fitting may e removed from the tube by pulling the plungers 28–30 out of the tube openings 20 and then sliding the fitting along the tube, as shown in FIG. 9.

The bar stock guide fitting has an annular housing 33, an end plate 34 removably attached to housing 33 by bolts 35, and a ball bearing 36 engaged between the outside of hub 21 and the end plate 34 and housing 33 to support the unitary assembly of the housing and end plate rotatably on hub 21. At its end next to end plate 34, housing 33 is formed with a cylindrical recess 37 (FIG. 7) which receives the outer and inner races of the ball bearing. Next to body 33, end plate 34 is formed with a cylindrical recess 38 which registers with the body recess 37 and receives the major part of the ball bearing. A snap ring 39 on hub 21 also holds the inner race of the ball bearing in place.

As shown in FIG. 4, housing 33 is formed with four radial openings 40 at 90 degree intervals circumferentially, each extending radially inward from its outer periphery 41 to its cylindrical axial opening or passageway 42. Each radial opening 40 in housing 33 slidably receives a corresponding roller holder which has a slotted, internally screw-threaded, outer sleeve 43 (FIG. 6) and a slotted, externally screw-threaded inner body 44.

At its inner end the inner body 44 of the roller holder is bifurcated, presenting opposite, spaced apart arms 45 and 46 carrying a cross pin 47 on which a cylindrical guide roller 48 for the bar stock is rotatably mounted. The inner body 44 has a cylindrical axial opening 44a (FIG. 7) and long diametrically opposed slots 49 with flat, parallel opposite sides on opposite sides of this axial opening.

The outer sleeve 43 of the roller holder has a screw-threaded axial opening 50 extending inward from its outer end face and a cylindrical opening 51 extending from the inner end of its screw-threaded opening 50 to its inner end face. Extending in from its outer end, the outer sleeve has a long diametrically opposed slots 52, each with flat, parallel, opposite sides. Slots 52 in outer sleeve 43 are registrable with slots 49 in inner body 44. Extending out from its inner end, sleeve 43 has short, wider slots 53 with flat, parallel, opposite sides. Slots 52 are wide enough to loosely receive roller 48, as shown in FIG. 4. On the outside sleeve 43 is formed with two sets of racks teeth 55a and 55b located diametrically opposite one another. The rack teeth of each set are arranged in succession longitudinally of the outer sleeve. The tip or outer land of each rack tooth has a circular curvature circumferentially of the outer sleeve.

Referring to FIG. 7, at each radial opening 40 the housing 33 is formed with a first, blind, screw-threaded recess 56 on the side of opening 40 toward end plate 34. On the opposite side of opening 40, housing 33 has a first transverse opening consisting of a cylindrical bore 57 and counterbore 58 coaxial with screw-threaded recess 56. Counterbore 58 is open at the end face 33' of housing 33 away from end plate 34. A retainer bolt R can extend across opening 40 with its screw-threaded inner end segment 59 threadedly received in recess 56 and an enlarged head 60 on its outer end received in counterbore 58.

Also, at each radial opening 40, housing 33 is formed with a second blind, screw-threaded recess 61 and a second transverse opening consisting of a bore 62 and a counterbore 63 aligned with recess 61. The second screw-threaded recess 61, second bore 62 and second counterbore 63 are located radially inward from the first screw-threaded recess 56, bore 57 and counterbore 58. Retainer bolt R may be positioned in the second screw-threaded recess, bore and counterbore instead of in the first, as shown in FIG. 7. FIG. 8 shows bolt R positioned in the second screw-threaded recess, bore and counterbore.

The position of each roller 48 with respect to the outer sleeve 43 in the roller support, radially of the bar stock 11, can be adjusted when the corresponding bolt R has been removed. By inserting the tip of a screwdriver or the like from the outer end of sleeve 43 into slot 49 in inner body 44, the inner body can be turned in sleeve 43. Preferably, the screw threads on inner body 44 and outer sleeve 43 are sixteen per inch of length, so that each full turn of inner body 44 changes its position along outer sleeve 43 by 1/16th of an inch. When the slots 49 in inner body 44 are in registration with the slots 52 in outer sleeve 43 and all of these slots are in registration with the screw-threaded recesses 56 and 61 in housing 33, the bolt R may be reinserted (1) into the first counterbore, bore and screw-threaded recess 58,57 and 56 for bar stock 11 of relatively large diameter or (2) into the second counterbore, bore and screw-threaded recess 63,62 and 61 for bar stock 11 of smaller diameter. When inserted, the bolt R locks the inner body 44 of the roller holder against turning in the outer sleeve 43 of that roller holder.

FIG. 10 shows a gauge for use in adjusting the roller holders in the bar stock guide fitting of the present invention. This tool comprises an annular body having a cylindrical sleeve 80 and a transversely enlarged head 81 on the outer end of the sleeve. The axial dimension X of head 81 is equal to the diameter of the guide roller 48 carried by that roller holder. Sleeve 80 is slidably insertable into the axial opening 44a in the inner body 44 of the roller holder. A cylindrical bore 83 extends axially through head 81 and sleeve 80. Head 81 carries a cross pin 84 which extends radially into bore 83. A generally cylindrical plunger 85 is slidably received in bore 83. This plunger on one side has a longitudinal recess 86 which snugly but slidably receives the inner end of cross pin 84.

The length of plunger 85 is equal to the radial dimension of the housing 33 of the bar stock guide fitting from its axis out to its cylindrical periphery 41. Therefore, when the head 81 is against the periphery 41 of housing 33, guide roller 48 engages the bar stock 11, and the inner end of plunger 85 engages guide roller 48, the length Y of plunger 85 radially outward beyond head 81 is equal to the radius of bar stock 11. Plunger 85 may be calibrated to show this dimension or a ruler may be used to determine it.

With this arrangement, the roller holder may be adjusted to accommodate a given size bar stock by positioning the inner body 44 of the roller holder along its outer sleeve 43 so that the protruding length Y of plunger 85 is equal to the radius of the bar stock 11, and then inserting the retaining bolt R to lock the parts 43 and 44 of the roller holder in this position.

Four relatively heavy weights 64 (FIG. 4) are slidably received in corresponding radial recesses 65 of circular cross-section in housing 33 midway between the roller holders in a direction circumferentially of the housing. Thus, the weights 64 are at 90 degree intervals from each other and at 45 degree intervals from the neighboring roller holders on either side. Each weight 64 is formed with a centrally located recess 66 which is open at the radially inner end of the weight and has a transverse end wall 67 near the outer end of the weight. A coil spring 68 is received in recess 66.

An adjusting screw 69 has a screw-threaded stem threadedly received in a screw-threaded opening 70 which is formed in the outer end wall 67 of weight 64 and opens into recess 66 in the weight. The adjusting screw has an enlarged cylindrical head 71 on its inner end which is slidably received in recess 66. Spring 68 is under compression between this head and the inner end 65' of radial recess 65 in housing 33. The adjusting screw 69 has a screw driver slot 72 in its outer end so that it may be turned to adjust the bias force exerted by spring 68.

On the outside, each weight 64 is formed with two sets of rack teeth 73a and 73b diametrically opposite each other. The rack teeth on each weight are identical to the rack teeth 55a and 55b on the roller holders sleeves 43. The tip or outer land of each rack tooth on each weight has a circular curvature circumferentially of the weight and it has a close sliding fit in the housing recess 65 which receives that weight.

Each weight 64 has a continuous cylindrical periphery except at its inner end, which is beveled. The cylindrical periphery of each weight has a sliding fit inside the corresponding housing recess 65, so that the weight can slide radially in housing 33.

An individual pinion gear A meshes with the rack teeth 55a on the outer sleeve 43 of each roller holder and the rack teeth 73a on the next weight 64 clockwise from it in FIG. 4. An individual pinion gear B meshes with the rack teeth 55b on the outer sleeve 43 of each roller holder and the rack teeth 73b on the next weight counterclockwise from it in FIG. 4. Thus, there are four gears A and four gears B in this embodiment of the invention.

As shown in FIG. 5 for one of the gears A, each gear A and each gear B is rotatably mounted in housing 33 at a respective bore 75 and counterbore 76. The gear has a cylindrical hub 77 at one end, which is rotatably received in bore 75, and a larger diameter cylindrical segment 78 on its opposite end, which is rotatably received in counterbore 76 adjacent the ball bearings 36 and end plate 34. The teeth of the gear are between its segments 77 and 78.

OPERATION

In the operation of this guide arrangement, before the bar stock 11 begins rotating it is centered radially of the housing 33 by the four guide rollers 48. The springs 68 bias the weights 64 radially outward, and through the gears A and B these weights hold the roller holders 43,44 and the rollers 48 radially inward.

Initially, the guide rollers 48 are positioned radially of housing 33 in accordance with the diameter of the bar stock 11 by adjusting the inner body 44 of each roller holder along the outer sleeve 43 of that roller holder. After removing the retainer bolt R, the inner body 44 can be turned within the outer sleeve 43 to adjust the position of the corresponding roller 48 radially in or out. When the desired adjustment has been made, the retainer bolt R is reinserted through the aligned slots 52 and 49 in the outer sleeve 43 and the inner body 44 of the roller holder. Depending on the size of the bar stock, each bolt R will be received in a corresponding outer recess 56, bore 57 and counterbore 58 or a corresponding inner recess 61, bore 62 and counterbore 63 in housing 33.

When the bar stock 11 is rotated by the screw machine, it causes the fitting housing 33 to rotate. The resulting centrifugal force on the weights 64 tends to force them radially outward, and through the gears A and B the weights force the roller holders sleeves 43 radially inward to maintain the corresponding rollers 48 in rolling engagement with the rotating bar stock.

Lateral displacement of the rotating bar stock 11 in one direction is resisted by the roller or rollers 48 on that side, which are held in by the adjacent centrifugal weights 64 acting through the corresponding gears A and B. Thus, bar stock displacement which tends to push a particular roller 48 and its holder radially outward tends to rotate the adjacent gear A clockwise and the adjacent gear B counterclockwise. Such rotations of these gears forces the adjacent weights 64 radially inward, but such inward movement of a weight is opposed both by centrifugal force acting on it and the bias spring 68. Consequently, the overall effect of the rollers 48 and their holders, the gears A and B, and the weights 64 is to minimize lateral vibration of the bar stock 11 during its rotation.

It is to be understood that the guide rollers 48 may be grooved, as shown in U.S. Pat. No. 4,566,358, and the bar stock 11 may be hexagonal or some other polygonal cross-section instead of being round, as shown herein.

I claim:

1. In a bar stock guide arrangement at the inlet side of a screw machine, said guide arrangement comprising:
   a plurality of rigid cross plates spaced apart at intervals along the path of the bar stock at the inlet side of the screw machine and having substantially horizontal openings therethrough for passing the bar stock;
   a plurality of annular fittings defining a longitudinal passageway for the bar stock;
   means rotatably mounting each fitting on a correresponding cross plate at said opening therein for permitting the fitting to rotate in unison with the bar stock when the bar stock is rotated by the screw machine;
   a plurality of rollers mounted in each fitting at circumferentially spaced locations around said longitudinal passageway for rolling engagement with the bar stock at different circumferential locations thereon;
   a plurality of weights slidably mounted in each fitting at circumferentially spaced locations around said longitudinal passageway for the bar stock to be urged laterally outward by centrifugal force as said fitting rotates;
   each of said weights being positioned between a pair of said rollers circumferentially around said longitudinal passageway for the bar stock;
   and means acting between said weights and said rollers to hold the rollers laterally inward against the bar stock in response to the urging of said weights outward by centrifugal force comprising:
   a holder for each roller slidably mounted in the corresponding fitting for movement laterally of said longitudinal passageway and having rack teeth on its opposite sides circumferentially around said longitudinal passageway;
   rack teeth on the opposite sides of each of said weights circumferentially around said longitudinal passageway;
   and respective pinion gears engaged between said holders and the neighboring weights and meshing with the rack teeth thereon to force said holders inward when centrifugal force urges said weights outward;
   the improvement wherein, for selectively adjusting the position of each holder laterally of said longitudinal passageway in accordance with the cross-sectional size of the bar stock, each of said holders comprises:
   an internally screw-threaded outer sleeve slidably mounted in said fitting and having said rack teeth of the holder thereon;
   and an externally screw-threaded inner body screw-threadedly adjustable along the inside of said outer sleeve;
   said outer sleeve and said inner body having transverse slots therein;
   and further comprising:
   a retainer member removably mounted on said fitting at each roller holder and extending across said outer sleeve and said inner body through said transverse slots therein to hold said outer sleeve and said inner body against rotation with respect to each other and with respect to said fitting.

2. A bar stock guide arrangement according to claim 1 wherein each of said retainer members is a screw-threaded bolt threadedly received in said fitting.

3. A bar stock arrangement according to claim 2 wherein:
   said fitting has a plurality of radial openings therein which slidably receive said holders for the rollers;
   said fitting at each of said radial openings therein has a transverse opening on one side of said radial opening and a screw-threaded recess on the opposite side of said radial opening in alignment with said transverse opening;
   and each of said bolts is slidably receivable in said transverse opening to extend across the corresponding radial opening and be threadedly received in said screw-threaded recess on the opposite side of said radial opening.

4. A bar stock guide arrangement according to claim 3 wherein:
   said fitting at each of said radial openings therein has a second transverse opening on said one side of the respective radial opening and a screw-threaded recess on the opposite side of said radial opening in alignment with said second transverse opening, said second transverse opening and screw-threaded recess being located radially inward along the corresponding radial opening from said first transverse opening and screw-threaded recess;
   and each of said bolts is slidably receivable in said second transverse opening to extend across the corresponding radial opening and be threadedly received in said second screw-threaded recess on the opposite side of said radial opening.

5. A bar stock guide arrangement according to claim 1, wherein:
   each of said fittings has an annular central hub and an annular body rotatably mounted on said hub and slidably receiving said holders and said weights and carrying said gears;
   and further comprising:
   a plurality of tubes rigidly attached to said cross plates and defining said openings therethrough for passing the bar stock, each of said tubes slidably supporting the respective hub of a corresponding fitting;

and means detachably securing the hub of each fitting to a corresponding tube and permitting the slidable removal of the entire fitting from said tube.

6. A bar stock guide arrangement according to claim 5 wherein:
each of said tubes has circumferentially spaced openings therein;
and said means detachably securing the hub of each fitting to a corresponding tube comprises plungers carried by said hub and receivable in said openings in said tube, and spring means biasing said plungers into said openings in said tube, said plungers being manually retractable against the bias of said spring means to release said plungers from said openings in said tube.

7. In a bar stock guide arrangement at the inlet side of a screw machine, said guide arrangement comprising:
a rigid cross plate positioned along the path of the bar stock at the inlet side of the screw machine and having a substantially horizontal opening therethrough for passing the bar stock;
an annular fitting defining a longitudinal passageway for the bar stock;
means rotatably mounting said fitting on said cross plate at said opening therein for permitting the fitting to rotate in unison with the bar stock when the bar stock is rotated by the screw machine;
a plurality of bar stock guide rollers mounted in said fitting at circumferentially spaced locations around said longitudinal passageway for engagement with the bar stock at different circumferential locations thereon to guide the bar stock through the fitting, said rollers being movable in the fitting transversely of said longitudinal passageway for the bar stock;
a holder for each roller slidably mounted in said fitting for movement transversely of said longitudinal passageway;
a plurality of weights slidably mounted in said fitting between successive rollers at circumferentially spaced locations around said longitudinal passageway for the bar stock, each of said weights being slidable transversely outward under centrifugal force as said fitting rotates;
and means acting between said weights and said holders for urging each holder transversely of said longitudinal passageway opposite to the movement of the adjacent weights so that the weights regulate the positions of the rollers transversely of said longitudinal passageway;
the improvement wherein, for selectively adjusting the position of each holder in said fitting transversely of said longitudinal passageway in accordance with the cross-sectional size of the bar stock, each of said holders comprises:
an internally screw-threaded outer sleeve slidably mounted in said fitting for movement transversely of said longitudinal passageway;
and an externally screw-threaded inner body screw-threadedly adjustable along the inside of said outer sleeve;
said outer sleeve and said inner body having transverse slots therein;
and further comprising:
a retainer member removably mounted on said fitting at each roller holder and extending across said outer sleeve and said inner body and snugly through said slots therein and holding said outer sleeve and said inner body against rotation with respect to each other and with respect to said fitting.

8. A bar stock guide arrangement according to claim 7 wherein each of said retainer members is a screw-threaded bolt threadedly received in said fitting.

9. A bar stock guide arrangement according to claim 8 wherein said means acting between said weights and said holders comprises:
rack teeth on the opposite sides of each of said weights circumferentially around said longitudinal passageway;
rack teeth on the opposite sides of each of said outer sleeves circumferentially around said longitudinal passageway;
and respective gears engaged between said outer sleeves and the neighboring weights and meshing with the rack teeth thereon to force said outer sleeves inward when centrifugal force urges the weights outward.

10. A bar stock guide arrangement comprising:
an annular fitting having an axial opening for passing the bar stock, a plurality of radial openings spaced apart circumferentially around said axial opening for receiving roller holders, and a plurality of radial recesses spaced apart circumferentially around said axial passageway between said radial openings;
means supporting said fitting for rotation with the bar stock as the bar stock passes through said axial opening in said fitting;
a plurality of guide holders in said radial openings in said fitting, each of said guide holders comprising a first member slidable in the corresponding radial opening and a second member screw-threadedly adjustable along said first member;
a plurality of bar stock guide members carried respectively by said second members of said guide holders and extending into said axial opening in said fitting to engage the bar stock at circumferentially spaced locations thereon;
a plurality of retainer members releasably engageable selectively with said first and second members of said guide holders to hold each second member in a fixed position along the corresponding first member;
a plurality of weights slidably mounted in said radial recesses in said fitting to be urged radially outward by centrifugal force as said fitting rotates;
and means acting between said weights and said first members of said guide holders to hold said bar stock guide members radially inward against the bar stock in response to the urging of said weights outward by centrifugal force.

11. A bar stock guide arrangement according to claim 10 wherein each of said stock guide members is a roller rotatably supported by said second member of the respective guide holder.

12. A bar stock guide arrangement comprising:
an annular fitting having an axial opening for passing the bar stock, a plurality of radial opening spaced apart circumferentially around said axial opening for receiving roller holders, and a plurality of radial recesses spaced apart circumferentially around said axial passageway between said radial openings;
means supporting said fitting for rotation with the bar stock as the bar stock passes through said axial opening in said fitting;

a plurality of roller holders in said radial openings in said fitting, each of said roller holders comprising a first member slidable in the corresponding radial opening and a second member screw-threadedly adjustable along said first member;

a plurality of bar stock rollers rotatably supported respectively by said second members of said roller holders and extending into said axial opening in said fitting to engage the bar stock circumferentially spaced locations thereon;

a plurality of retainer members releasably engageable selectively with said first and second members of said roller holders to hold each second member in a fixed position along the corresponding first member;

a plurality of weights slidably mounted in said radial recesses in said fitting to be urged radially outward by centrifugal force as said fitting rotates;

and means acting between said weights and said first members of said roller holders to hold said rollers radially inward against the bar stock in response to the urging of said weight outward by centrifugal force;

said first member of each holder being an internally screw-threaded outer sleeve;

said second member of each holder being an externally screw-threaded inner body which is screw-threadedly adjustable along the inside of said outer sleeve of said holder;

said outer sleeve and said inner body having transverse slots therein which are selectively registrable with each other;

and each of said retainer members being a bolt removably attachable to said fitting for reception in said transverse slots in said outer sleeve and said inner body of the corresponding holder.

13. A bar stock guide arrangement according to claim 12 wherein said means acting between said weights and said holders comprises:

rack teeth on the opposite sides of each of said weights circumferentially around said longitudinal passageway;

rack teeth on the opposite sides of each of said outer sleeves circumferentially around said longitudinal passageway;

and respective gears engaged between said outer sleeves and the neighboring weights and meshing with the rack teeth thereon to force said outer sleeves inward when centrifugal force urges the weights outward.

14. A bar stock guide arrangement according to claim 13 wherein:

said fitting at each of said radial openings therein has a transverse opening on one side of said radial opening and a screw-threaded recess on the opposite side of said radial opening in alignment with said transverse opening;

and each of said bolts is slidably receivable in said transverse opening to extend across the corresponding radial opening and be threadedly received in said screw-threaded recess on the opposite side of said radial opening.

15. A bar stock guide arrangement according to claim 14 wherein:

said fitting at each of said radial openings therein has a second transverse opening on said one side of the respective radial opening and a screw-threaded recess on the opposite side of said radial opening in alignment with said second transverse opening, said second transverse opening and screw-threaded recess being located radially inward along the corresponding radial opening from said first transverse opening and screw-threaded recess;

and each of said bolts is slidably receivable in said second transverse opening to extend across the corresponding radial opening and be threadedly received in said second screw-threaded recess on the opposite side of said radial opening.

16. A bar stock guide arrangement according to claim 12 wherein:

said fitting at each of said radial openings therein has a transverse opening on one side of said radial opening and a screw-threaded recess on the opposite side of said radial opening in alignment with said transverse opening;

and each of said bolts is slidably receivable in said transverse opening to extend across the corresponding radial opening and be threadedly received in said screw-threaded recess on the opposite side of said radial opening.

17. A bar stock guide arrangement according to claim 16 wherein:

said fitting at each of said radial openings therein has a second transverse opening on said one side of the respective radial opening and a screw-threaded recess on the opposite side of said radial opening in alignment with said second transverse opening, said second transverse opening and screw-threaded recess being located radially inward along the corresponding radial opening from said first transverse opening and screw-threaded recess;

and each of said bolts is slidably receivable in said second transverse opening to extend across the corresponding radial opening and be threadedly received in said second screw/threaded recess on the opposite side of said radial opening.

18. In a bar stock guide arrangement at the inlet side of a screw machine, said guide arrangement comprising:

a rigid cross plate positioned along the path of the bar stock at the inlet side of the screw machine;

a tube rigidly attached to said cross plate and defining a substantially horizontal opening through the cross plate for passing the bar stock;

an annular fitting defining a longitudinal passageway for the bar stock, said fitting having an annular hub slidably receiving said tube and a body rotatably mounted on said hub;

means detachably securing said hub of the fitting to said tube and permitting the slidable removal of the entire fitting from said tube;

a plurality of bar stock guide members mounted in said fitting at circumferentially spaced locations around said longitudinal passageway for engagement with the bar stock at different circumferential locations thereon to guide the bar stock through the fitting, said guide members being movable in the fitting transversely of said longitudinal passageway for the bar stock;

a holder for each guide member slidably mounted in said body of the fitting for movement transversely of said longitudinal passageway;

a plurality of weights slidably mounted in said body of the fitting between successive guide members at circumferentially spaced locations around said longitudinal passageway for the bar stock, each of said weights being slidable transversely outward under centrifugal force as said fitting rotates;

and means in said body of the fitting acting between said weights and said holders for urging each holder transversely of said longitudinal passageway opposite to the movement of the adjacent weights so that the weights regulate the positions of the guide members transversely of said longitudinal passageway.

19. A bar stock guide arrangement according to claim 18 wherein:

said tube has circumferentially spaced openings therein;

and said means detachably securing said hub of the fitting to said tube comprises plungers carried by said hub and receivable in said openings in said tube, and spring means biasing said plungers into said openings in said tube, said plungers being manually retractable against the bias of said spring means to release said plungers from said opening in said tube.

20. A bar guide arrangement according to claim 18 and further comprising means for selectively adjusting the position of each holder in said fitting transversely of said longitudinal passageway in accordance with the cross-sectional size of the bar stock.

* * * * *